Nov. 21, 1939.   H. J. KUHLMAN   2,180,595
CORN HARVESTER
Filed Jan. 6, 1937
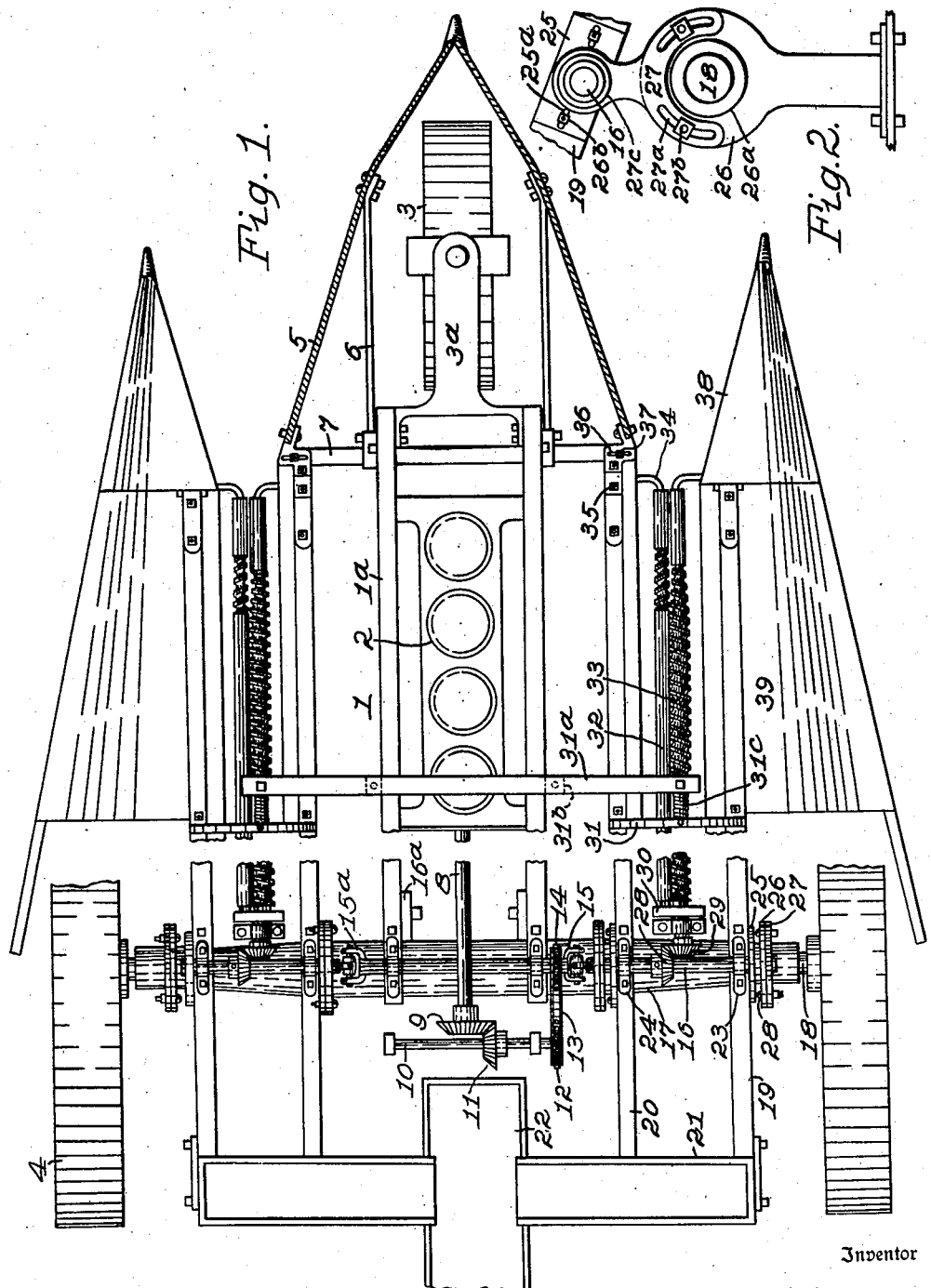
Inventor
Henry J. Kuhlman,
By G. C. Kennedy
Attorney Patented Nov. 21, 1939

2,180,595

UNITED STATES PATENT OFFICE 2,180,595

CORN HARVESTER

Henry J. Kuhlman, Waterloo, Iowa, assignor to Kuhlman Manufacturing Company, Waterloo, Iowa, a corporation of Iowa Application January 6, 1937, Serial No. 119,247

1 Claim. (Cl. 56—18)

My invention relates to improvements in corn harvesters, and an object of my improvements is to so couple a connected pair of such harvesters as to permit of their being adjustably spaced apart at their forward gathering parts transversely to thereby conform to any of differently spaced rows of corn stalks ahead and to thus prevent riding down of stalks because of improper alinement therewith.

Another object of my improvements is to so relate such a pair of harvesters to an intermediate or otherwise coupled tractor device, that the harvesters may be propelled thereby as so adjusted relatively transversely to each other and the tractor, that corn rows may be successfully gathered thereby without riding down, and when so gathered may be divested of ears broken from their stems within their husks, without loss of ears when so removed by being pushed from their husks during the forward progress of the coupled harvesters.

Another object of my improvements is to provide means on the harvesters for adjusting their rear parts suitably to permit the harvesters to be adjusted transversely apart as above stated, to cause them to be alined properly with two rows of corn stalks ahead, in either of transversely spread positions when suitably adjusted therefor.

Another object of my improvements is to furnish tiltable adjustable connections between the forward and rear parts of the tractor to permit of sidewise spreading adjustably of the gathering elements of both harvesters, during such adjustments.

These objects I have attained in successful reduction to practice, by the means and coacting mechanisms which are hereinafter illustrated, described and claimed, and it is to be understood that my invention includes mechanical equivalents or any variations thereof to be used for the above purposes.

In the appended drawing; Fig. 1 is a top plan of a pair of spaced corn harvesters of like construction supported on opposite sides of an intermediate tractor, the latter shown in diagrammatic form, and parts of the harvesters and tractor being medially transversely broken away, with certain portions of the mechanisms of both removed. Fig. 2 is an enlarged side elevation of one of the rear adjusting devices for adjustably lifting and tilting said harvesters relative to the tractor.

Corn (maize) rows are generally planted with like parallel rows of hills, having like spacing transversely, but at times the rows are otherwise spaced. For instance, such rows may be spaced apart at any distance from a minimum spacing of 36 inches to 42 inches, or to any intermediate spacing between said limits, apart, due to the employment of different planters used. It has therefore been found, that a harvester pair whose spacing apart of their fenders transversely is one of such dimensions only, when operating upon two rows of corn stalks with a different spacing of the rows, this will cause a displacement of the receiving fenders relative to the rows, whereby many or all of the corn stalks are ridden down and not operated upon, or broken at their bases or bodily pulled from the soil.

It is the object, therefore, of my improvements, to provide perfectly operating means for gathering stalks of such rows, by adjustments of the means to accommodate the harvesters to either of such transverse spacing of the rows, to prevent the said inconvenience and loss.

The numeral 1 denotes a tractor, with parts removed or broken away, positioned between two like corn harvesters. The tractor has a frame 1a with spaced rigid side beams on which is mounted a motor 2 of the usual type, and the forward end of said frame has a medial forwardly projecting arm 3a upon whose forward extremity is mounted a laterally swingable steering wheel 3. Just ahead of said motor is a fixed cross beam 7 extending at both ends laterally under the frame.

The tractor has a widely spaced pair of rear carrying wheels 4 fixed on an axle 18 which traverses and is rotatable in and through the whole length of a tubular housing 17. Referring to said Fig. 2, the axle 18 is shown as rotatably seated at each end in a sleeve bearing or outward projection 26a of an upwardly widened standard 26 whose base is fixed on a side beam 19 of the adjacent harvester. The opposite parts of the widened end of the standard has bolt-holes traversed by bolts 27b. Upon one face of the widened portion of each standard is mounted a crescental member 27 having an upper narrowed projection having an apertured bearing at 27c in which is seated an end part of a sectional rotatable shaft 16, whose end sections are connected by means of universal couplings 15 and 15a to an intermediate section of the shaft. This shaft is mounted in bearings 24 on a plurality of spaced longitudinal beams 19 and 20 of the pair of harvesters, the outer beams 19 at their forward ends supporting the fender parts 38 and 39 as usual. The beams 19 are tiltable forward and back in said bearing 27c on the shaft 16. A plate 25 is secured to the outer wall of each beam 19 for adjustments therealong by the bolts 26b traversing longitudinal slots 25a in said beam. The beam may be thus with the harvester frame tilted on the shaft end 16. The crescental part 27 may also be tilted rockably on the standard 26, forward or rearwardly. Opposite arcuate slots receive therethrough the bolts 27b secured by end nuts. These standards 26, which are on both of the beams 19 and 20, may have the plates 27 all adjusted alike tiltably to permit the rear part of the harvesters to be tilted forward and back to thus more or less depress or elevate them and to adjust the inclination of the harvesters forwardly and downwardly. As stated above, the frames of the harvester may be adjusted longitudinally where the bolts 26b traverse the longitudinal slots 25a in the beams 19 and 20.

The rear ends of the beams 19 carry inwardly downwardly inclined chutes 21 which deliver husked ears into the forward part of the trough 22 for an endless carrier, but the chutes are not secured to the trough.

It will be understood that the mechanism thus far described as well as the tractor and harvester framings may be varied without departing from my invention which is not dependent on details. Also the invention herein is not confined to such details of gathering, and breaking of ears within and from the husks as are disclosed in my prior Patent No. 2,169,070 and application for patent Serial Number 115,112. In the present drawings, I have shown like pairs of ear breaking and cleaning rolls 32 and 33, whose forward ends are rotatable on the inbent bracket rods 34, their rear ends seated in the bearings 30, with the rear end only of the roll 33 carrying a miter gear 29 in mesh with a miter pinion 28 in each case on said shaft 16. The motor shaft 8 carries at its rear end a miter gear 9 meshing with a miter pinion 11 on a transverse shaft 10 mounted on parts of the frame by supports not shown. On one end of the shaft 10 is mounted a sprocket wheel 12 carrying one end of a sprocket chain 13 whose forward end is carried by another sprocket wheel 14 mounted on said shaft 16 to drive it with the rolls 32 and 33 as before explained.

On the forward end of the tractor frame are pivoted forwardly extending arms 6 to whose forward parts are secured medial parts of a prow 5 (shown in horizontal section). The numeral 35 denotes one of a like but reversed pair of S-shaped brackets bolted rigidly to the forward ends of the harvester beams 20, and each bracket has a transverse slot 36 traversed by a bolt and nut connection at 37, whereby the beam 20 and the frame of the harvester in front may be laterally adjusted, in order to position the forward terminations of the pairs of rolls 32 and 33 apart more or less, to thus space the interspaces thereof laterally apart the proper distance to conform medially to the middle lines of two adjacent rows of corn stalks in spaced hills.

In order to make the necessary adjustments of these parts, when the adjustments have been effected at 36 and 37, also by tilting adjustments made between all the standards 26, plates 27 and beams 19 and 20, the parts being then secured in their adjusted positions, the two pairs of rolls 32 and 33 are prepared in lateral spacing apart to ride in alinement with the rows of stalks medially, as necessary to conform to the particular spacing of the rows.

As the only connections between the tractor and the pair of harvesters are those shown, it will be seen that the latter may be effectively adjusted relatively to the tractor and to each other, it being especially noted that the pair of universal couplings 15 and 15a of the sections of the shaft 16 allow of such relative adjustments of the harvesters as above described as the coupling connections permit relative movements of the frames of the harvesters to and from each other sufficiently to permit of varying the interspaces of the forward receiving ends of the rolls 32 and 33 to allow the rolls to span the stalks in the rows medially, thus preventing any possibility, as would be the case with harvesters rigidly non-adjustably connected, of the fenders and adjacent members riding down any stalks, or breaking them off. These adjustments need to be made for the particular spacing of the rows, when of different widths in different fields, and may be afterwards again adjusted for a field where the corn rows are less or more widely spaced apart.

It will also be noted that as the middle section of the shaft 16 is positively driven by the tractor motor 8 and intervening mechanism, the rocking relatively of the harvester frames in making the above adjustments does not affect in any way the operations of the pairs of rolls with their intervening gearing.

The forwardly inclined frame beams 19 are pivoted near their rear ends adjustably as shown in Fig. 2. As shown in Fig. 1, the frames 19 and 20 of the harvesters are resiliently suspended and supported upon the tractor side beams 1a. Vertical standards 31b are shown in broken lines as fixed on the beams 1a, and a transverse plate 31a is fixed on these standards. The harvester pairs of beams 19 and 20 are rigidly connected by arches 31. Coiled springs 31c connect the arches 31 suspensively from the ends of the plate or cross-bar 31a. The harvesters are thus hung medially resiliently from the cross-bar 31a and supported on the tractor frame 1, and may be swung upwardly and downwardly by means not shown, but which will be included and claimed in another application for patent not filed.

I claim:

In combination, a tractor having a forward prow, a pair of like corn harvesters positioned on opposite sides of the tractor and having forward prows, the corn harvesters having frames containing longitudinal pairs of oppositely rotatable coacting gathering, snapping and husking rolls driven by the mechanism of the tractor, the harvester frames extending alongside the tractor, longitudinal side bars on said frame, rigid adjustable connecting means between the forward ends of said bars and unconnected to the tractor, and means for hinging the rear ends of the said bars to the rear tractor construction, whereby said frames may be limitedly adjusted laterally to and from the tractor by adjustments of said connecting means between the bars and rocking adjustments of said hinging means on the tractor.

HENRY J. KUHLMAN.